United States Patent [19]
Yana

[11] Patent Number: 4,590,486

[45] **Date of Patent: * May 20, 1986**

[54] THERMAL INK TRANSFER PRINTING APPARATUS

[75] Inventor: Masasumi Yana, Yokohama, Japan

[73] Assignee: Kabushiki Kaisha Toshiba, Kawasaki, Japan

[ * ] Notice: The portion of the term of this patent subsequent to May 14, 2002 has been disclaimed.

[21] Appl. No.: 700,140

[22] Filed: Feb. 11, 1985

Related U.S. Application Data

[63] Continuation of Ser. No. 541,028, Oct. 12, 1983, Pat. No. 4,517,573.

[30] Foreign Application Priority Data

Oct. 18, 1982 [JP] Japan ............................... 57-181372

[51] Int. Cl.[4] ............................................ G01D 15/10

[52] U.S. Cl. ............................... 346/76 PH; 346/105; 400/120; 219/216

[58] Field of Search ................ 346/76 PH, 76 R, 105; 400/120; 219/216 PH; 400/223, 231; 250/316.1, 317.1, 318, 319; 101/8, 9, 21, 25, 27, 31; 318/567, 568

[56] References Cited

U.S. PATENT DOCUMENTS

| | | | |
|---|---|---|---|
| 3,810,192 | 5/1974 | Okabe | 346/76 PH |
| 3,855,448 | 12/1974 | Hanagata et al. | 346/76 PH |
| 4,039,065 | 11/1976 | Seki et al. | 346/76 PH |
| 4,350,987 | 9/1982 | Hanagata et al. | 346/76 PH |
| 4,468,139 | 8/1984 | Hattori | 400/120 |

*Primary Examiner*—E. A. Goldberg
*Assistant Examiner*—A. Evans
*Attorney, Agent, or Firm*—Oblon, Fisher, Spivak, McClelland & Maier

[57] ABSTRACT

A thermal ink transfer printing apparatus comprising a carriage moved along the rotating shaft of a platen roller, and a thermal head provided with a row of heating elements. A fixture which is urged backward by a spring is rotatably attached to the carriage and to the front side of which is attached the thermal head. A solenoid is fixed on the carriage with its core rod contacted with the backside of the fixture. An ink ribbon fed from an ink ribbon feeding reel and wound around an ink ribbon reel after passing through the thermal head. The ink ribbon feeding and winding reels are arranged on the carriage. When current is applied to the solenoid, the thermal head is pressed against the platen roller to closely contact the ink ribbon with a recording sheet on the circumference of the platen roller, while when current supply is stopped to the solenoid, the thermal head is retreated to peel off the ink ribbon from the recording sheet. When blanks corresponding to two serial characters are applied to the thermal head, both of current supply to the solenoid and the winding of the ink ribbon are stopped, to thereby avoid the winding of the ink ribbon unused.

18 Claims, 15 Drawing Figures

THERMAL INK TRANSFER PRINTING APPARATUS

This is a continuation of application Ser. No. 541,028, filed Oct. 12, 1983, now U.S. Pat. No. 4,517,573.

BACKGROUND OF THE INVENTION

The present invention relates to a thermal ink transfer printing and recording apparatus of the nonimpact type.

With the thermal ink transfer printing apparatus, an ink carrying film whose ink is softened or melted by heating is joined with a recording sheet and heat is applied to a predetermined picture region so that the softened or melted ink may be transferred to the recording sheet. The printing apparatus of this type is so simple in principle and configuration as to be easily inspected.

FIG. 1 shows a conventional thermal ink transfer printing apparatus of the serial type cited from Japanese Patent Publication No. 21471/Sho-57, for example. With this thermal ink transfer printing apparatus, reels 14 and 16 for supplying and winding an ink film 12 are arranged on a carriage 10, and the ink ribbon 12 fed from the reel 14 is wound by the reel 16 through a thermal head 18 where a heating resistance is formed. The carriage 10 reciprocates in a direction perpendicular to the moving direction of a recording sheet 20. During the reciprocating movement of the carriage 10, the ink film 12 is put on the recording sheet 20 in such a way that they do not move relative to each other, and the thermal head 18 generates heat selectively responsive to recording signal. Ink softened and melted by the heat selectivity generated from the thermal head 18 is transferred to the recording sheet 20.

With this conventional thermal ink transfer printing apparatus, however, the ink film 12 is being wound by the reel 16 even when the carriage 10 runs at the blank portion of the recording sheet where no picture is to be recorded. The ink film 12 is therefore wasted in vain, leaving that portion thereof unused which is not heated by the thermal head 18 and is not transferred to the recording sheet. As apparent from the above, the conventional thermal ink transfer printing apparatus is low in the efficiency of using the ink film.

In addition, as the diameter of the ink film wound by the reel 16 becomes larger and larger, the angle formed by the running passage of the ink film 12 and the thermal head 18 changes to thereby vary the force by which the ink film 12 is urged to the thermal head 18. Unevenness is thus caused in the consistency of ink transferred by the thermal head, and ink transfer capacity is made worse particularly when the diameter of the ink film wound around the reel 16 becomes large. Further, in the case of this reel 16 which is rotated to wind the ink film, the relationship between the rotating speed of said reel 16 and the running speed of the ink film 12 is changed by the diameter of the ink film wound around the reel 16. In order to run the ink film 12 at a certain speed, therefore, the rotating speed of the reel 16 must be changed corresponding to the diameter change of the ink film wound around the reel 16. No conventional thermal ink tranfer recording apparatus, however, could eliminate the above-mentioned drawbacks by means of a simple mechanism.

SUMMARY OF THE INVENTION

An object of the present invention is to provide a thermal ink transfer printing apparatus capable of preventing an ink film from being wasted to thereby enhance the ink film using efficiency.

Another object of the present invention is to provide a thermal ink transfer printing apparatus wherein the force of urging the ink film to a thermal head is certain to enhance the ink transfer capacity.

A further object of the present invention is to provide a thermal ink transfer printing apparatus having a simple mechanism to drive a winding reel.

According to the present invention, there is provided a thermal ink transfer printing apparatus for recording to a recording medium a plurality of characters consisting of letters and blanks comprising a platen roller having a rotating shaft and rotatable around the rotating shaft, a carriage arranged adjacent to the platen roller, a moving means for moving the carriage along the rotating shaft of the platen roller, a thermal head including a plurality of heating elements arranged on a line crossing the moving direction of the carriage and selectively generating heat in response to electrical signals of the characters, a supporting means for supporting the thermal head to the carriage in such a way that the thermal head can reciprocate relative to the platen roller, an ink film having a base layer and an ink layer on the base layer, a running means for running the ink film between the thermal head and the platen roller with its base layer directed to the thermal head, a pressing means for urging the thermal head to the platen roller to closely contact the ink film with the recording medium which is fed between the ink film and the platen roller, a detecting means for generating a stop signal when this means detects that the number of characters to be applied to the thermal head is a predetermined serial number of blanks, and a releasing and stopping means for releasing, when the stop signal is applied, thermal head from being pressed by the pressing means and stopping the running of the ink film driven by the running means, after a predetermined time lapses from when a signal relating to the last letter just before the blanks to be followed is applied to the thermal head.

According to the present invention, the pressing means is released from urging the thermal head and the running means is stopped from running the ink film when the character signals applied to the thermal head are a predetermined serial number of blanks. Therefore, that portion of the ink film which is discharged unused from the ink transfer area between the thermal head and the recording sheet is reduced to thereby eliminate the waste of the ink film and enhance the ink-film-using-efficiency.

DETAILED DESCRIPTION OF THE PREFERRED EMBODIMENT

Figure 1:
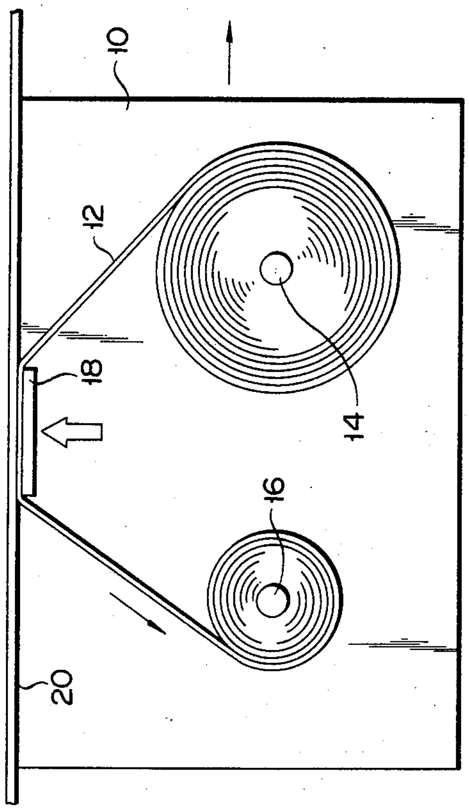
FIG. 1 (PRIOR ART)
FIG. 1 is a plan view showing a conventional thermal ink transfer printing apparatus of the serial type.
Figure 2:
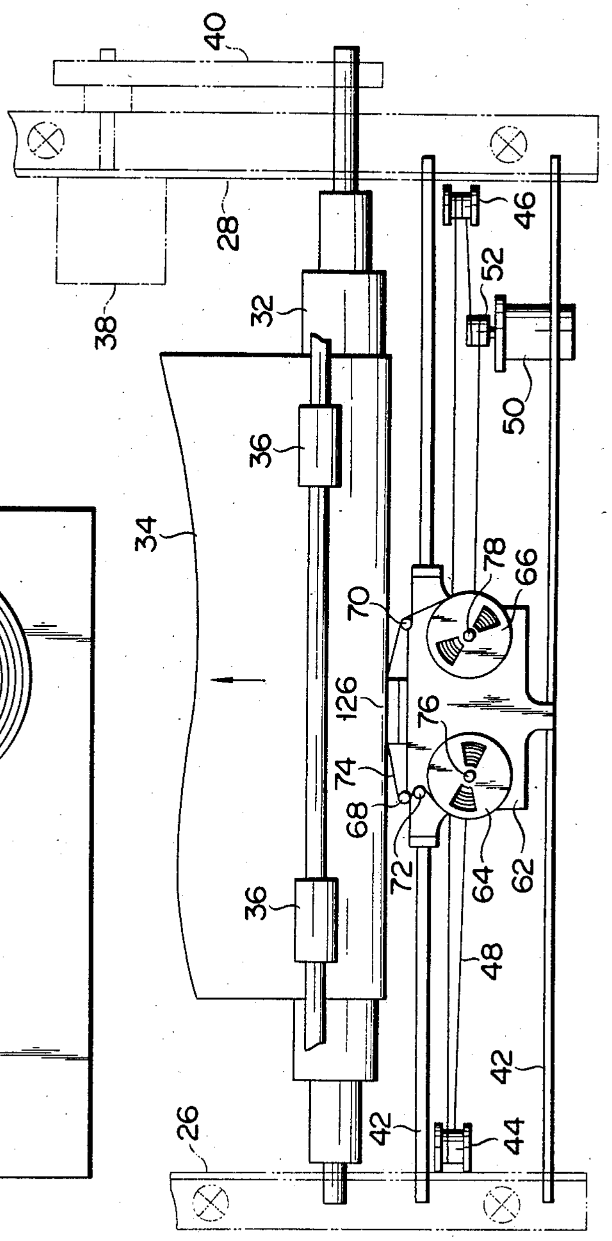
FIG. 2 is a plan view showing an example of thermal ink transfer printing apparatus according to the present invention.
Figure 3:
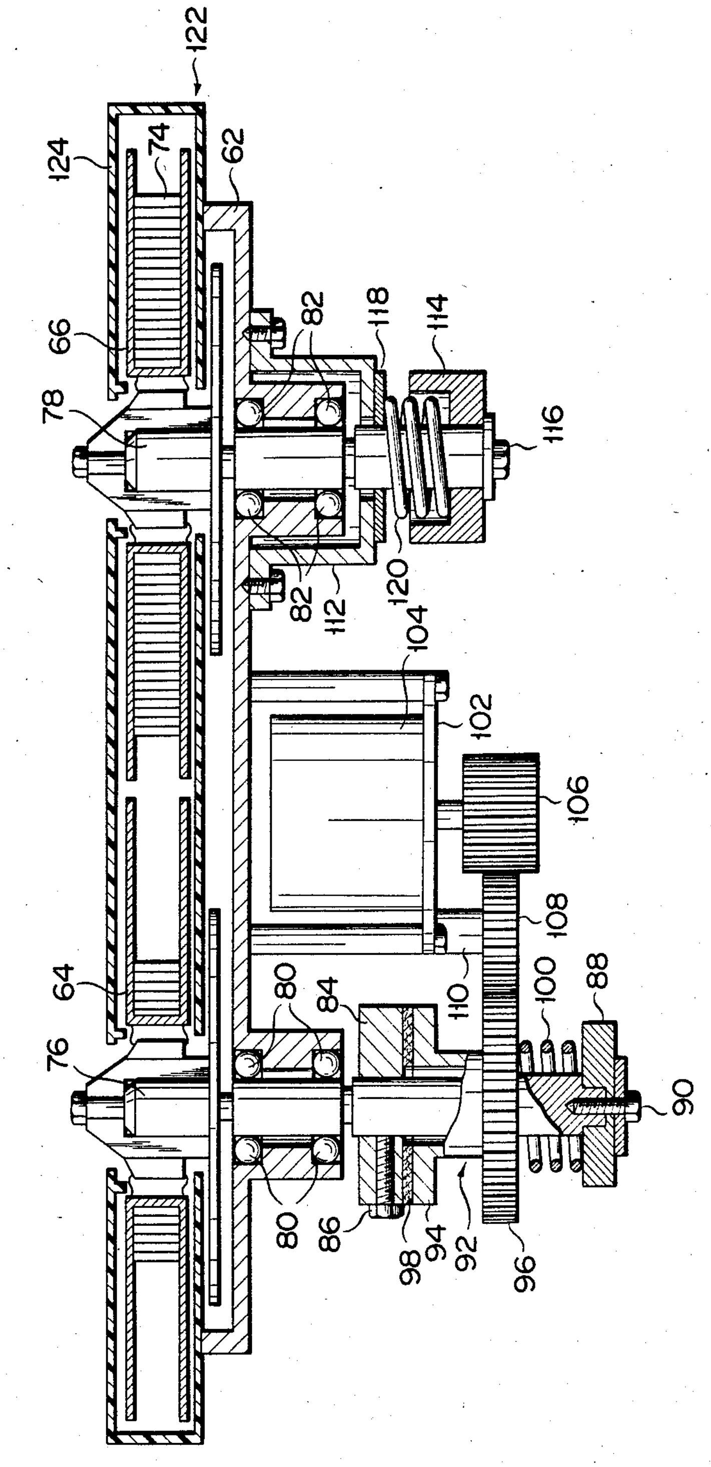
FIG. 3 shows the thermal ink transfer printing apparatus of FIG. 2 longitudinally sectioned.
Figure 4:
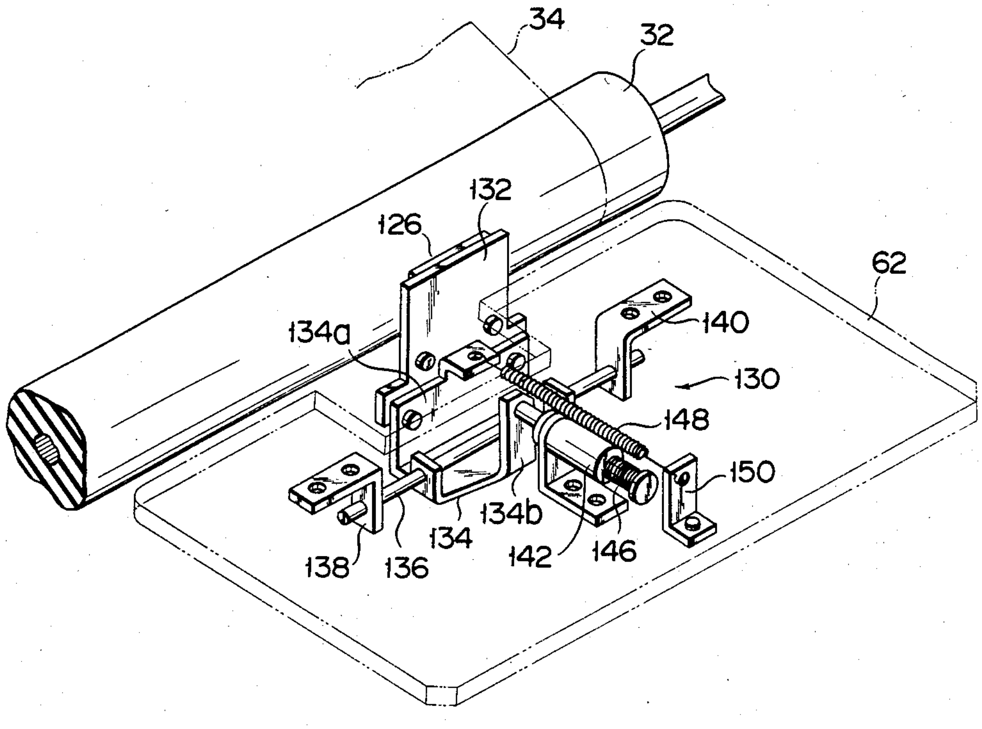
FIG. 4 is a perspective view showing an urging mechanism for the thermal head employed by the thermal ink transfer printing apparatus of FIG. 2.

FIGS. 2 through 4 show an example of thermal ink transfer printing apparatus according to the present invention, in which FIG. 2 is a plan view, FIG. 3 is a longitudinally sectioned view, and FIG. 4 is a perspective view showing an urging mechanism for a thermal head. A platen roller 32 extending in the width direction of the thermal ink transfer printing apparatus is rotatably supported between side plates 26 and 28. Pinch rollers 36 whose longitudinal direction is parallel to that of the platen roller 32 are urged against the platen roller 32 in such a way that the pinch rollers 36 rotate together with the platen roller 32. A recording sheet 34 is wound around the platen roller 32 by means of the pinch rollers 36. That portion of the platen roller 32 around which the recording sheet 34 is wound is covered by rubber whose hardness (or JIS hardness) is from 25 to 40 deg. A motor 38 is attached to the side plate 28 and rotating force of the motor 38 is transmitted to the platen roller 32 through a belt 40 which is stretched between the rotating shaft of the motor 38 and the shaft of the platen roller 32. Two guide rail 42 parallel to the platen roller 32 are fixed between the side plates 26 and 28. A carriage 62 is mounted on the guide rails 42 to run along the guide rails 42. Pulleys 44 and 46 are arranged near both ends of the guide rails 42, and a belt 48 is strecthed between these pulleys 44 and 46. One end of the belt 48 stretched between the pulleys 44 and 46 is fixed to the carriage 62 while the other end thereof is wound on or more times around a pulley 52 attached to the rotating shaft of a motor 50 which is attached to the body of the thermal ink transfer printing apparatus. The carriage 62 is reciprocated on the guide rails 42 through the pulley 52 and the belt 48 when the motor 50 rotates forward and backward.

Figure 5:
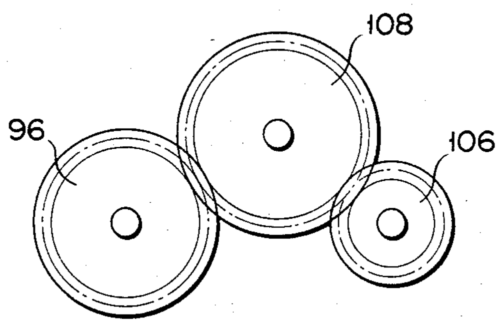
FIG. 5 is a plan view showing the arrangement of gears.

The carriage 62 is provided with an ink ribbon winding shaft 76, an ink ribbon feeding shaft 78, an ink ribbon guiding shafts 68, 70 and 72, with a thermal head. The carriage 62 runs keeping its face horizontal. The ink winding and feeding shafts 76 and 78 are arranged with a certain distance interposed therebetween in the running direction of the carriage 62 and freely rotatably supported by bearings 80 and 82 keeping them vertical in their longitudinal direction. A disc-like friction plate 84 is fitted onto the ink winding shaft 76 below the bearing 80 and fixed thereto by means of a bolt 86. A disc-like stopper plate 88 is fixed to the lower end of the ink winding shaft 76 by means of a bolt 90, with its face kept parallel to the face of the friction plate 84. A friction member 92 is freely rotatably fitted onto the ink winding shaft 76 between the friction plate 84 and the stopper plate 88. This friction member 92 has a flange portion 94 formed integral to the upper end thereof, and a gear 96 formed integral to the lower end thereof. The upper surface of the flange portion 94 is flat and covered by a sheet of felt 98. A compression spring 100 is interposed between the gear 96 and the stopper plate 88. The friction member 92 is therefore urged against the friction plate 84 by the elastic force of the spring 100 to thereby cause the sheet of felt 98 to closely contact with the underside of the friction plate 84. The ink winding shaft 76 is thus rotated together with the gear 96, but when force is applied to the ink winding shaft 76 to prevent its rotation, relative rotation is caused between the sheet of felt 98 and the friction plate 84 to thereby make the rotating speed of the ink winding shaft 76 different from that of the gear 96. A stay 102 is attached to the underside of the carriage 62, and a motor 104 is attached to the stay 102 with its shaft kept vertial. A gear 106 is fixed to the rotating shaft of this motor 104. A rotating shaft 110 is rotatably attached to the stay 102 with its longitudinal direction kept vertical, and a gear 108 is fixed to the rotating shaft 110. These three gears 96, 106 and 108 are arranged so that the gear 96 is engaged with the gear 108, and that the gear 108 is engaged with the gear 106, as shown in FIG. 5, and the rotating force of the motor 104 is transmitted through the gears 106 and 108 to the gear 96 and then to the friction plate 84 and the ink winding shaft 76 through the sheet of felt 98. Since the diameter (or number of teeth) of the gear 106 is smaller than that of the gear 96 in this case, the rotating speed of the motor 104 is reduced and transmitted to the gear 96 and the ink winding shaft 76.

A friction stay 112 is fixed to the underside of the carriage 62 where the ink ribbon feeding shaft 78 is located. A stopper member 114 is fixed by a bolt 116 to the lower end of the ink ribbon feeding shaft 78. A friction plate 118 is fixedly fitted onto the ink ribbon feeding shaft 78 under the friction stay 112. A compression spring 120 is interposed between the friction plate 118 and the stopper member 114, and the friction plate 118 is elastically deformed a little and urged against the underside surface of the stay 112 by means of the spring 120. Friction force caused by sliding contact between the stay 112 and the plate 118 gives backward tension to the rotation of the ink ribbon feeding shaft 78.

Figure 6:
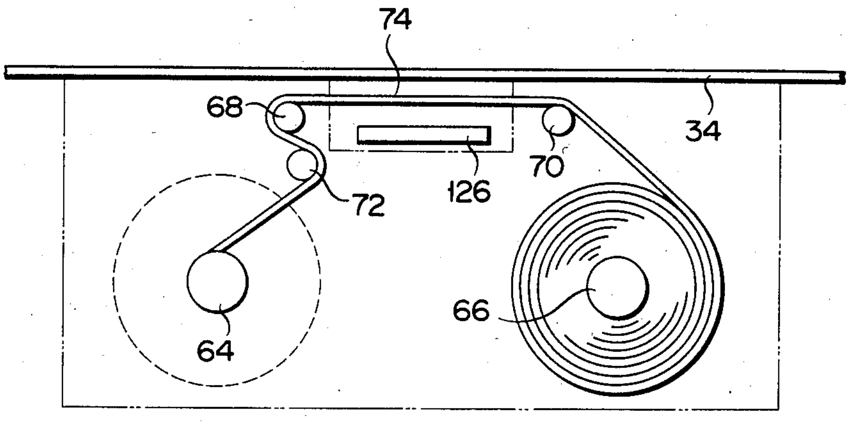
FIG. 6 is a plan view showing the running line of an ink ribbon at the non-printing time.
Figure 7:
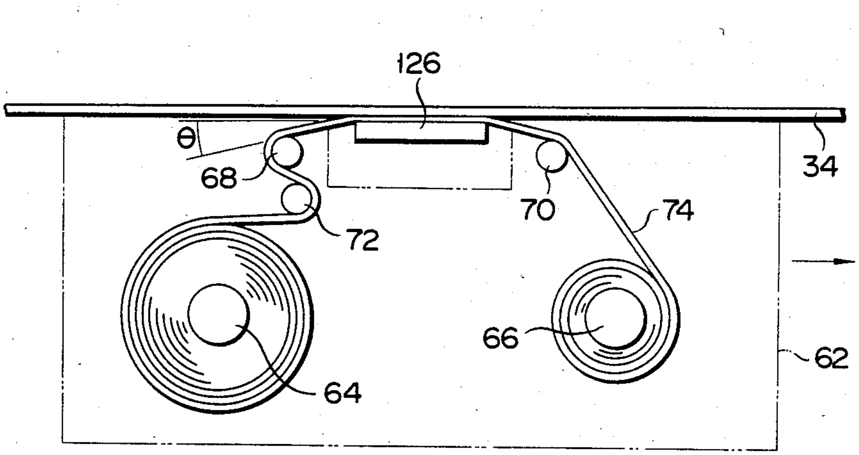
FIG. 7 is a plan view showing the running line of the ink ribbon at the ink printing time.

As shown in FIG. 3, the reels 64 and 66 for winding and feeding the ink ribbon 74 are housed in the cassette case 124 of a cassette 122, and the ink ribbon 74 is stretched between the ink ribbon winding reel 64 and the ink ribbon feeding reel 66, as shown in FIGS. 6 and 7. When the cassette 12 in which the ink ribbon 74 is housed is set on the carriage 62, the reels 64 and 66 are fitted onto the ink ribbon winding and feeding shafts 76 and 78, respectively. The reel 64 is thus rotatingly driven by the ink ribbon winding shaft 76, and the ink ribbon 74 fed from the reel 66 is given backward tension by the ink ribbon feeding shaft 78.

As shown in FIG. 2, the carriage 62 is provided with a thermal head 126 adjacent to the platen roller 32. Two guide shafts 68 and 72 are located between the ink ribbon winding shaft 76 and the thermal head 126, and the guide shaft 70 is located between the ink ribbon feeding shaft 78 and the thermal head 126. The ink ribbon 74 fed from the ink ribbon feeding reel 66 which is fitted onto the shaft 78 is guided through the guide shaft 70, thermal head 126, guide shaft 68 and guide shaft 72 and wound around the ink ribbon winding reel 64 which is fitted onto the shaft 76. The running path of the ink ribbon 74 is defined to be of S-shaped particularly by the guide shafts 68 and 72.

The ink ribbon has the base layer directed to the thermal head, and the ink layer directed to the recording sheet. More specifically, the ink ribbon 74 is wound around the ink ribbon winding and feeding reels 64 and 66 with its ink layer directed outside. The base layer is made of a material such as polyester film, condenser paper and glassine which are large in mechanical tensile strength and whose thermal resistances are small in their thickness direction. The base layer is preferably 3–15 μm thick. The ink layer is formed by coating on the base layer an ink which is made by mixing oil-doluble dye, oil black, disperse dye or subliming dye with a binder such as carnauba wax, micro-crystal wax and low molecular weight polyethylene. The ink layer is preferably 2–15 μm thick and the melting temperature of ink is 60°–80° C.

As shown in FIGS. 6 and 7, the thermal head 126 can reciprocate in relation to the platen roller 32 and the recording sheet 34, and when it is adjacent to the platen roller 32, it urges the ink ribbon 74 and the recording sheet 34 against the platen roller 32. A means 130 for reciprocating the thermal head 126 in relation to the platen roller 32 and urging the thermal head 126 to the platen roller 32 will be described below, referring to FIG. 4. A side of the carriage 62 which faces the platen roller 32 is cut off rectangular and the thermal head 126 is located in this cut-off portion of the carriage 62. L-shaped members 138 and 140 are fixed on the bottom of the carriage 62, with a distance interposed therebetween in the longitudinal direction of the platen roller 32. A rotating shaft 136 is rotatably supported between the L-shaped members 138 and 140. A fixture 134 for the thermal head is fixed substantially in the center of the rotating shaft 136. The fixture 134 has a front face 134*a* and a back face 134*b* which face parallel to each other with the rotating shaft 136 interposed therebetween. A plate 132 to which the thermal head is attached is fixed to the upper portion of the front face 134*a*, and the thermal head 126 is attached to that side of the plate 132 which is directed to the platen roller 32. The thermal head 126 has 9–24 units of heating elements which generate heat by applying current, for example, which are arranged in a line in a direction perpendicular to the running direction of the carriage 62 (or the longitudinal direction of the platen roller 32). The thermal head 126, plate 132 and fixture 134 are rotatably around the rotating shaft 136. When the thermal head 126 is in contact with the platen roller 32, the row of the heating elements on the thermal head 126 is brought into contact with the circumferential face of the platen roller 32. A solenoid 142 of the push-pull type is arranged on the carriage 62 behind the fixture 134, directing its core rod 144 to the fixture 134. The front end of this core rod 144 is in contact with the back side 134*b* of the fixture 134. The core rod 144 of the solenoid 142 is urged backward by a compression spring 146 which is interposed between the back end flange of the core rod 144 and the body of the solenoid 142. An L-shaped stopper member 150 is fixed on the carriage 62 behind the solenoid 142. A tension spring 148 is stretched between the upper end of the front side 134*a* of the fixture 134 and the upper end of the stopper member 150 to swing the fixture 134 and the thermal head 126 backward. When the solenoid 142 is powered, its core rod 144 advances to push the back side 134*b* of the fixture 134 forward, so that the fixture 134 is swung to urge the thermal head 126, which is fixed to the plate 132, against the platen roller 32. When power supply is stopped to the solenoid 142, the core rod 144 is drawn backward by the spring 146, so that the fixture 134 which has been released from the urging force of the core rod 144 is swung backward by the spring 148. The thermal head 126 is thus separated from the platen roller 32.

As described above, the thermal head 126 can be reciprocated relative to the platen roller 32 by the solenoid 142. As shown in FIG. 6, the thermal head 126, ink ribbon 74 and recording sheet 34 are separated from one another when the thermal head 126 is retreated. On the other hand, when the thermal head 126 is advanced, the ink ribbon 74 and the recording sheet 34 are sandwiched between the thermal head 126 and the platen roller 32, under which current is selectively applied to the row of the heating elements on the thermal head 126 to generate heat, by which the ink on the ink ribbon 74 is softened and melted to be transferred to the recording sheet 34.

Figure 8:
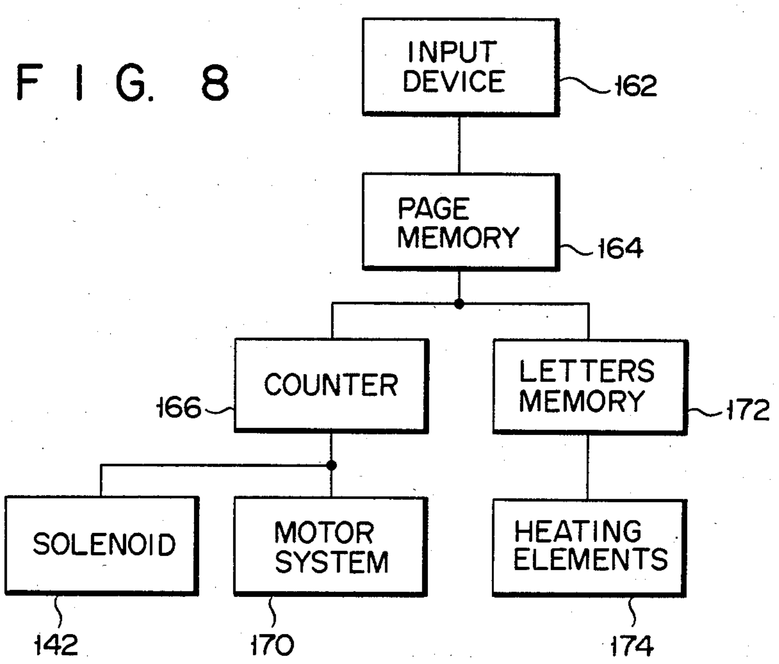
FIG. 8 is a block diagram showing a signal processing line.

A signal process line will be described referring to the block diagram shown in FIG. 8. An input device 162 inputs letters to be printed, using its keyboard, for example. The input device 162 converts input signals to their corresponding letter cord signals according to Athky code, for example. When a blank space key is pushed, for example, the signal is converted to a signal "0010000". Output signals of the input device 162 are transmitted to a page memory 164 and temporarily stored there. When a predetermined amount of data is stored in the page memory 164, the data is serially applied to a letters memory 172, which is a read-only-memory (ROM). Letter dot patterns are stored in the letters memory 172. When a letter code signal is applied from the input device 162 to the letters memory 172 through the page memory 164, the letters memory 172 has the function of a kind of converter in that a pattern of 24×24 dots of a letter addressed by the letter code signal is outputed. Output signals of the letters memory 172 are 24 units of parallel signals, which are applied at a certain cycle of 24 units of heating elements 174 on the thermal head 126.

Output signals of the page memory 164 are applied to a letter/blank counter 166 as will as the letters memory 172. The counter 166 has a function of counting the sum (which will be referred to as the number of characters) of the number of letters and the number of blanks, and another function of counting only the number of blanks. The letter code signal is a signal having a certain length of bits, which corresponds to its intended letter completely. It is therefore easy to find whether the letter code signal applied corresponds to a letter or blank. The transmitting time of the letter code signal applied from the page memory 164 and the time of counting operation performed by the counter 166 are made extremely shorter than the cycle at which the parallel signals are applied to the heating elements 174. When the parallel signals are once applied to the heat generating resistances 174, therefore, the counting corresponding to at least two characters has been completed by the counter 166.

An operation signal is applied to the solenoid 142 and a motor system 170, basing on the counting result obtained by the counter 166. The motor system 170 has the motor 50 for running the carriage 62, the motor 104 for driving the ink ribbon winding shaft 76, and the motor 38 for driving the platen roller 32. When it receives a character (letter or blank) signal, the counter 166 applies a rotation command signal "1" to the motor 50 of the motor system 170 and a rotation stop command signal "0" to the motor 38. When it receives a letter code signal, the counter 166 counts letter number "1" and blank number "0" and applies operation signal "1" to the solenoid 142 and rotation command signal "1" to the motor 104, and further clears a value integrated by counting only the number of blanks. When the blank signal is successively applied twice to the counter 166, the number of blanks becomes "2". When, so a power stop (or urge releasing) command signal "0" is applied from the counter 166 to the solenoid 142 and a rotation stop signal "0" is also applied from the counter 166 to the motor 104 of the motor system 170. When a letter code signal is applied to the counter 166, a value integrated by counting the number of blanks is cleared and operation signal "1" is again applied to the solenoid 142 and the motor 104. On the other hand, when the value integrated by counting the number of characters (including blanks) comes to a predetermined number which corresponds to one line on the recording sheet, urge releasing command signal "0" is applied from the counter 166 to the solenoid 142, rotation stop command signal "0" to the motor 104, a signal for commanding reverse rotation to the motor 50, and rotation command signal "1" to the motor 38. The carriage 62 and the thermal head 126 are thus returned to a position where printing is to be started, while the platen roller 32 and the recording sheet 34 are shifted by one line.

Figure 9:
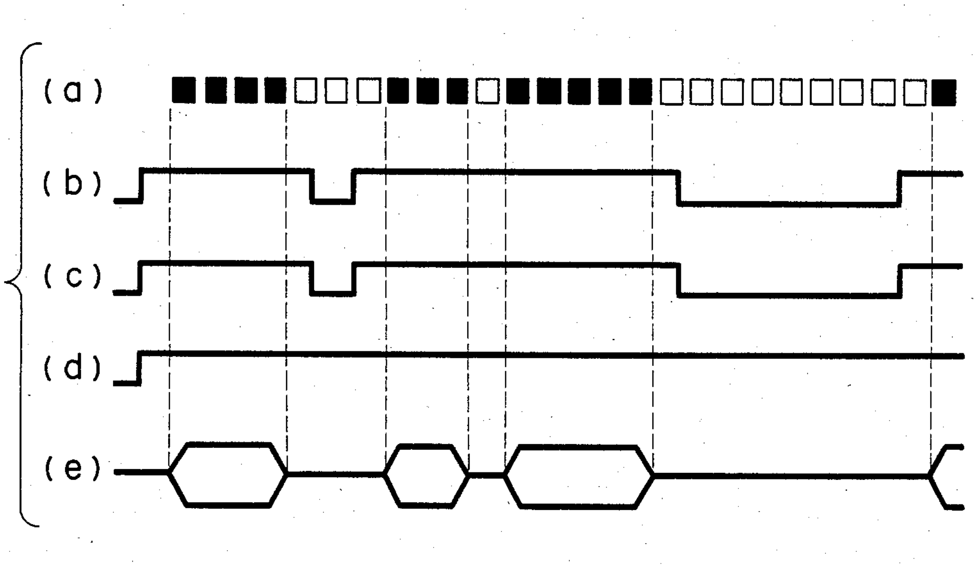
FIG. 9 is a timing chart showing timings at which each of the signals is applied.

The operation of the thermal ink transfer printing apparatus constructed as described above will be described referring to a timing chart shown in FIG. 9. FIG. 9(*a*) shows a mode under which characters are applied to the thermal head 126 and in which black squares show letters while white squares show blanks. FIGS. 9(*b*), 9(*c*) and 9(*d*) show operation signals, respectively, in relation to the solenoid 142, motor 104 and motor 50, and FIG. 9(*e*) shows time during which data are transferred.

When the cassette 122 for the ink ribbon 74 is set on the carriage 62, the thermal head 126 is retreated as shown in FIG. 6. A letter code signal converted by the input device 162 is applied to the page memory 164. When data corresponding to a sheet of the recording paper is stored in the page memory 164, it is serially applied to the counter 166 and the letters memory 172. When a character (letter or blank) signal is applied to the counter 166, rotation command signal "1" is applied to the motor 50 of the motor system 170, as shown in FIG. 9(*d*). When a letter code signal is applied to the counter 166 as shown in FIG. 9(*a*), operation signal "1" is applied to the solenoid 142 and the motor 104 as shown in FIGS. 9(*b*) and 9(*c*). The letter code signal is converted to a pattern of dots by the letters memory 172 and then applied to the heating elements 174 on the thermal head 126. As shown in FIGS. 9(*b*), 9(*c*) and 9(*d*), operation signals applied to the solenoid 142 and motors 104, 50 are preceded in this case by 50–100 msec faster than signals applied to the heating elements 174 (as shown in FIGS. 9(*a*) and 9(*e*)), taking into account the time needed till rotation of motors is started.

When the solenoid 142 is powered, its core rod 144 is advanced against the spring 146 to push the back side 134*b* of the fixture 134, so that the fixture 134 is swung forward, taking the rotating shaft 136 as its center, against the force of the spring 148. The thermal head 126 is thus advanced toward the platen roller 32 to urge its heating elements 174 against the circumferential face of the platen roller 32, as shown in FIG. 7. Since the recording sheet 34 and the ink ribbon 74 are present between the platen roller 32 and the thermal head 126 in this case, they are sandwiched between the thermal head 126 and the platen roller 32 by the urging force of the solenoid 142 in such a way that they are contacted close to each other not to cause any relative movement. When the ink layer of the ink ribbon 74 is heated by the heating elements 174 on the thermal head 126 under this state, the ink is softened and melted to be transferred to the recording sheet 34. While the thermal head 126 and the carriage 62 are continuously moving in the longitudinal direction of the platen roller 32, the time during which heat is transmitted from the heating elements 174 to the ink layer of the ink ribbon 74 is set extremely short and the influence of the moving thermal head 126 in relation to the ink transferring operation can be thus neglected.

The ink ribbon 74 is closely contacted with the recording sheet 34 by the urging force of the thermal head 126 and also by the bonding force of the softened and melted ink. Since the carriage 62 is always moving from the side plate 26 toward another side plate 28 during printing process, the thermal head 126 is also always moving in the direction shown by an arrow in FIG. 7. The ink ribbon 74 is thus successively overlapped on the recording sheet 34 on the side of the guide shaft 70 and successively peeled off from the recording sheet 34 on the other side of the guide shaft 68. The ink ribbon 74 thus peeled off is wound by the ink winding reel 64, which is rotatingly driven by the shaft 76 driven by the motor 104. The running speed of the ink ribbon 74 is determined certain by the moving speed of the carriage 62. Therefore, the rotating speed of the ink ribbon winding reel 64 is fast when the diameter of the ink ribbon 74 wound around the reel 64 is small, while it is slow when the diameter is large. The rotating speed of the ink winding reel 64 is adjusted by a slip mechanism comprising the sheet of felt 98 and the friction plate 84 (see FIG. 3). More specifically, when the diameter of the ink ribbon 74 wound around the reel 64 is large, the rotation of the motor 104 whose speed is substantially certain is reduced by slip caused between the sheet of felt 98 and the friction plate 84, and then transmitted to the shaft 76. Tension T of the ink ribbon 74 wound around the reel 64 is thus kept substantially certain independently of the diameter of the wound ink ribbon 74. The ink ribbon 74 runs through the guide shafts 68 and 72 to form the letter of S between the thermal head 126 and the ink ribbon winding reel 64. The ink ribbon 74 can therefore run more stably as compared with when it is guided only by the guide shaft 68. The ink ribbon 74 is defined in its running path by the guide shaft 68 and can be thus peeled off from the recording sheet 34, keeping usually certain angle $\theta$ formed between the recording sheet 34 and the ink ribbon 74 (see FIG. 7). Therefore, component force of tension T of the ink ribbon 74 which acts in a direction perpendicular to the recording sheet 34 is T sin $\theta$, which is substantially certain independently of the diameter of the ink ribbon 74 wound around the reel 64. Therefore, that force which peels the ink ribbon 74 from the recording sheet 34 is substantially certain. Angle $\theta$ is determined by the peeling-off capability of the ink ribbon 74 or the like and preferable to be set in a range of 25°-50°, as will be described later. Force P of the thermal head 126 which acts to urge the ink ribbon 74 and the recording sheet 34 can be expressed as follows by force F of the means 130 which pushes the thermal head 126 when the solenoid 142 is powered, and by tension T of the ink ribbon 74:

$$P = F - T \sin \theta$$

Force F is determined by electromagnetic force caused when the solenoid 142 is powered, and certain when current applied to the solenoid 142 is certain. As already described above, T sin $\theta$ is substantially certain. Therefore, force P is substantially certain, and usually certain urging force is given to the ink ribbon 74 and the recording sheet 34. Only tension T necessary to peeling-off may be given to the ink ribbon 74 and this tension T is less than a several-th of force F. Therefore, urging force P is substantially equal to F. Current applied to the solenoid 142 to compensate reduction of urging force P caused by tension T is therefore so small as to be negligible. Backward tension due to friction caused between the friction plate 118 and the underside of the stay 112 is given to the ink ribbon 74 between the ink ribbon feeding reel 66 and the thermal head 126.

When four of letter code signals are applied to the counter 166 successively, as shown in FIG. 9(*a*), the value integrated in the counter 166 includes character number "4" and blank number "0". And when blanks are applied to the counter 166 as fifth and sixth characters, the value integrated in the counter 166 comes to have character number "6" and blank number "2". If so, operation stop signal "0" is applied to the solenoid 142 and rotation stop signal "0" is applied to the motor 104. Supply of current to the solenoid 142 is thus stopped, causing the core rod 144 to be retreated by the spring 146 while the thermal head 126 also to be retreated by the spring 148. The ink ribbon 74 released from the urging force of the thermal head 126 peels off as a whole from the recording sheet 34, as shown in FIG. 6. The motor 104 is stopped and the winding of the ink ribbon 74 is also stopped. The carriage 62 is kept running.

Both of operation releasing signal "0" and rotation stop signal "0" are applied to the solenoid 142 and the motor 104, respectively after a predetermined time lapses from the time when the heating elements 174 have finished printing the fourth letter. This is intended to delay the retreating of the thermal head 126 and the operation stop of the ink ribbon winding reel 64 until that portion of the ink ribbon 74 which is softened and melted by the heating elements 174 passes through its peeling-off point between the ink ribbon 74 and the recording sheet 34 on the side of the guide shaft 68 of the thermal head 126. It is thus possible that the ink ribbon 74 is closely contacted with the recording sheet 34 and that softened and melted ink is reliably transferred to the recording sheet 34.

When a letter code signal is applied, as the eighth character, from the page memory 164 to the counter 166, the counter 166 integrates character number to "8" and clears blank number to "0". Operation signal "1" is again applied to the solenoid 142 and the motor 104 and printing is carried out by the thermal head 126.

A blank is applied, as the eleventh character, to the counter 166, and the counter 166 integrates blank number to "1". A letter is applied, as the twelfth character, to the counter 166, however, the counter 166 clears blank number to "0". Even if a blank is present at the eleventh, therefore, neither retreating of the thermal head 126 nor stop operation of the ink winding reel 64 is caused. The reason why none of these operations is caused in the case of one blank is that the time necessary for these operations is longer than that necessary for printing one letter. More specifically, printing of one dot needs about 2 msec, and printing of one letter needs therefore about 48 msec, providing that one letter consists of 24 dots. The moving speed of the carriage 62 is therefore about 48 msec per the distance of one character. The solenoid 142 and the motor 104, need, however, about 50 msec to retreat the thermal head 126 and stop the ink ribbon winding reel 64, and then to rotate the ink ribbon winding reel 64 and advance the thermal head 126. When these successive operations are carried out in the case of one blank, therefore, trouble is caused in printing a letter next to the blank, and neither release of thermal head nor stop of the ink ribbon winding reel is done in this case.

When character number in the counter 166 comes to a predetermined value and printing of one line is finished, release and stop signal "0" is applied from the counter 166 to the solenoid 142 and the motor 104, and reverse rotation signal is applied to the motor 50 while rotation signal "1" is applied to the motor 38. The carriage 62 is thus returned to the side of the hub 44 and the platen roller 32 is rotated by one line. Needless to say, both of release of the thermal head and stop of the ink ribbon winding reel are done even in this case after that portion of the ink ribbon which is to be heated to print a last letter passes through its peeling-off point.

When the ink film 74 is not used to transfer letters, as described above, it will not be wound around the ink ribbon winding reel 64, thus preventing the ink film from being wasted in vain and enabling the ink film to be used with high efficiency.

Figure 10:
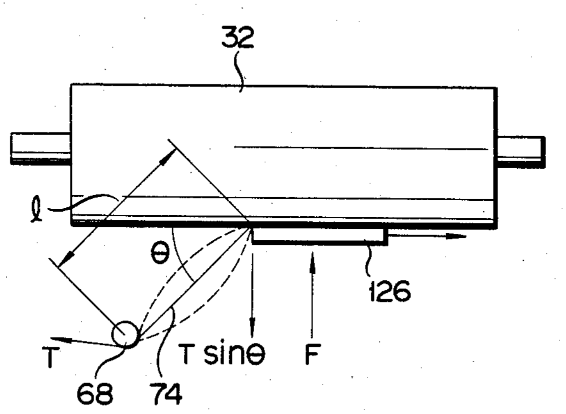
FIG. 10 is a view employed to explain factors which give influence to printing characteristic.
Figure 11:
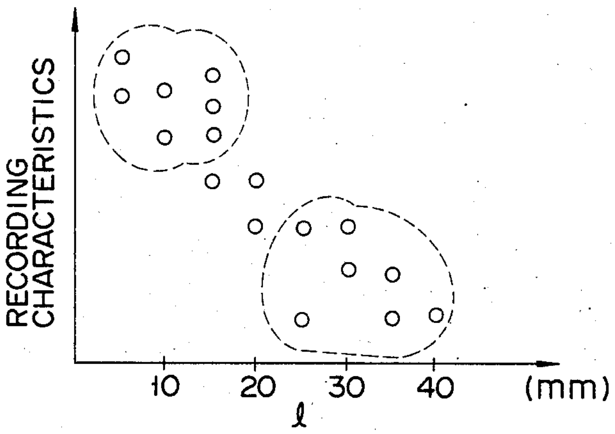
FIG. 11 is a graph showing the results of printing characteristic.

Angle $\theta$ formed between the peeled-off ink ribbon 74 and the recording sheet 34 is preferably set to be in a range of 25°-50°, as described above. The reason is as follows. Using an embodiment of the present invention shown in FIG. 10, inventors examined changes in recording characteristic when distance l between the peeling-off point of the ink ribbon 74 and the guide shaft 68 was changed, keeping certain the distance between the guide shaft 68 and the platen roller 32. The results are shown in FIG. 11. The smaller l is, the larger $\theta$ becomes. Reversly, when l is large, $\theta$ becomes small. When $\theta$ is small, the peeling-off of the ink ribbon 74 from the recording sheet 34 becomes worse to cause inferior transfer printing. It is therefore preferable that $\theta$ is set larger than 25° (l is smaller than 20 mm at this time).

Figure 12:
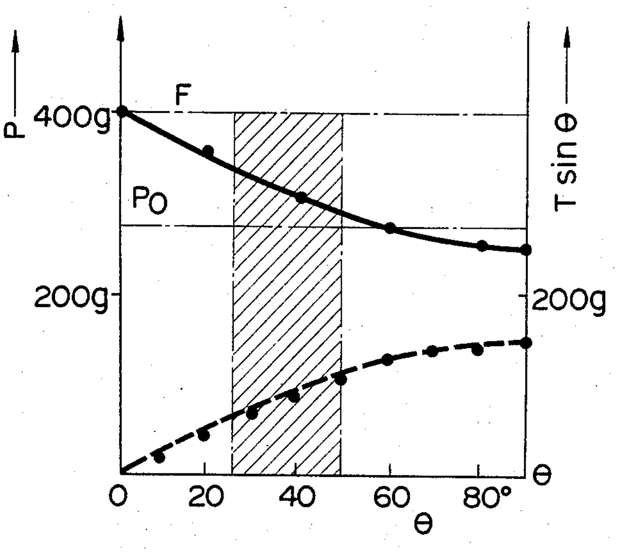
FIG. 12 is a graph showing the relationship between urging force applied by the thermal head to the ink ribbon and the recording sheet and θ.

Sandwiching force P between the thermal head 126 and the platen roller 32 changes responsive to changes of $\theta$ as shown by a solid line in FIG. 12. Force F with which the thermal head 126 presses against the platen roller 32 is certain, but force T sin $\theta$ with which the thermal head 126 is drawn backward by tension T of the ink ribbon 74 changes responsive to changes of $\theta$ as shown by a broken line in FIG. 12. Therefore, P expressed by the equation $P = F - T \sin \theta$ changes as shown by the solid line in FIG. 12. When P for sandwiching the ink ribbon 74 and the recording sheet 34 is small, inferiorities in transfer-printing such as unevenness in the density of ink transfer-printed and lack of letters trasnfer-printed are casused. Therefore, sandwiching force P is preferably larger than Po (about 280 g). As apparent from the above, it is preferable to set $\theta$ to the range of 25°–5°.

Figure 13:
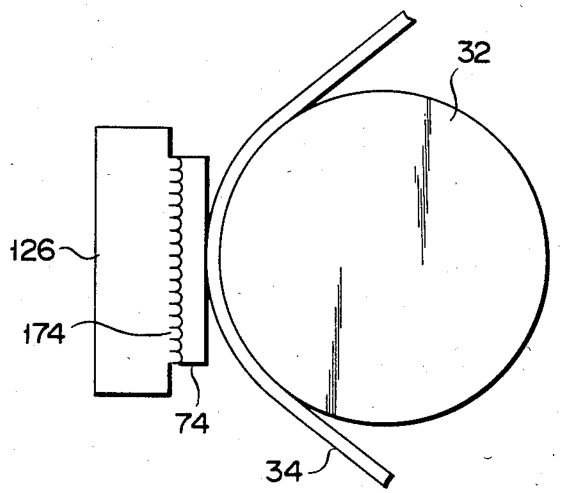
FIGS. 13 and 14 are longitudinally sectioned views showing the state under which the thermal head is urged to the platen roller.
Figure 14:
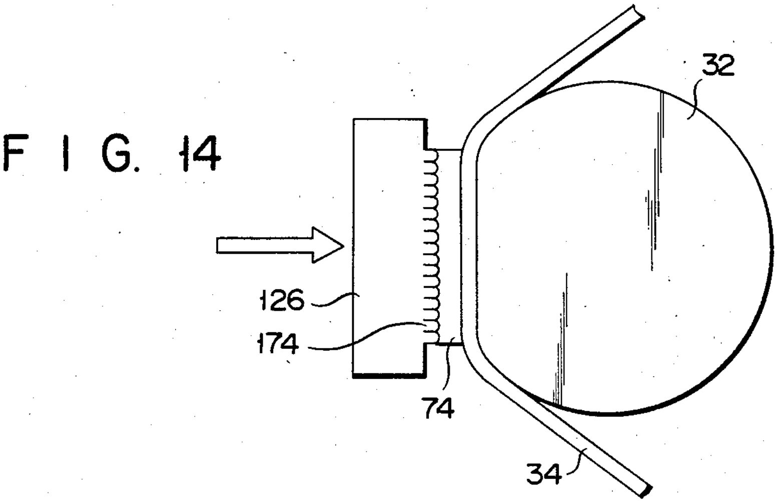

Rubber for forming the circumferential face of the platen roller 32 is selected to perferably have a hardness (or JIS hardness) ranging from 25° to 40°, as described above. With the heat sensitive recording device employed in the conventional facsimile, rubber hardness for the platen roller is set larger than 55° (JIS hardness). When rubber, large in hardness, is used, force with which the thermal head 126 presses the platen roller 32 is small in the case of this embodiment wherein current applied to the solenoid 142 is controlled low, and only linear contact is therefore established between the recording sheet 34 and the ink ribbon 74, as shown in FIG. 13, so that satisfactory contact is not occurred between the row of 24 units of heating elements 174 and the ink ribbon 74 or recording sheet 34, thus casing inferior transfer-printing such as a lack of transfer-printed letters. In order to solve this problem and to allow the row of heating elements on the thermal head 126 to uniformly press the recording sheet 34 against the platen roller 32 with the ink ribbon 74 interposed, as shown in FIG. 14, rubber having the hardness of 25°–40° is employed for the platen roller 32, thus enabling all of dots to be finely transfer-printed and causing no inferior transfer-printing such as lack of transfer-printed letters.

Figure 15:
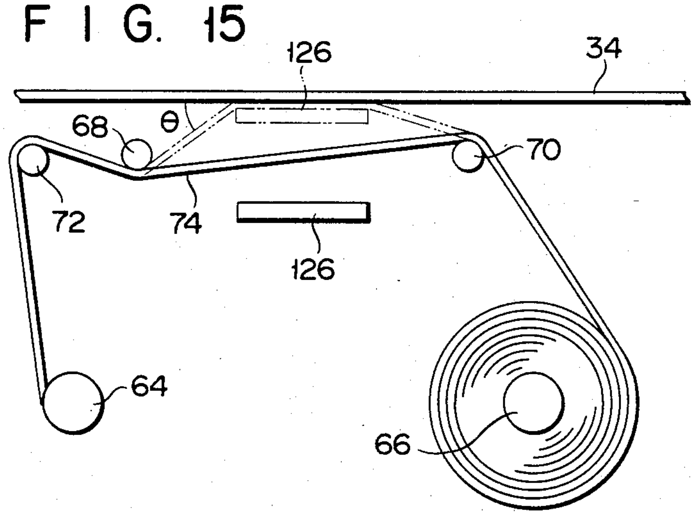
FIG. 15 is a plan view showing the running line of the ink film employed by another example of thermal ink transfer printing apparatus according to the present invention.

Another embodiment of the present invention will be described referring to FIG. 15. In the case of this embodiment, the guide shaft 72 is located opposite to the guide shaft 70 with the guide shaft 68 interposed. The ink ribbon 74 is wound around the ink ribbon winding reel 64, passing round the guide shaft 68 on the side of the reel 64 and round the guide shaft 72 on another side opposite to the reel 64. In short, the ink ribbon 74 is guided by the guide shafts 68 and 72 to form a reverse S-shape. When the thermal head 126 advances, the ink ribbon 74 is presses against the recording sheet 34, as shown by two-dot-and-dash lines in FIG. 15. Angle $\theta$ formed between the ink ribbon 74 and the recording sheet 34 is certain in this case similar to the case of the embodiment shown in FIG. 7, independently of the amount of ink ribbon wound around the reel 64.

Although some embodiments of the present invention have been described above, it is not necessarily based on the number of blanks whether the winding of the ink ribbon is to be stopped or not. In short, the purpose of the present invention resides in that the winding of the ink ribbon is stopped when the ink of the ink ribbon is not transfer-printed. More preferably, the winding of the ink ribbon is stopped when time length (or interval between current supplies) during which no current is applied to the heating elements is longer than time length necessary for stopping and releasing the winding of the ink ribbon, preventing the reduction of the recording speed.

When the thermal head is located and driven in the manner of the serial type as in the case of the embodiments, for example, one line of the heating elements is driven at same time every one current supply (parallel signal). the heating elements are selectively heated this time, but when none of the heating elements is selected and print timing without heat applied occurs serially more than a predetermined number of times, the winding of the ink ribbon may be stopped.

Signal supplied to the thermal head in this case must be supplied not as a code but as a picture element (or dot). It is preferable that recording signals are temporarily stored in the memory before being supplied to the thermal head and that time for inspecting the state of these recording signals stored is allowed to have.

The transmitting time of letter code signals supplied from the page memory 164 and time necessary for calculating process in the counter 166 are extremely shorter than the cycle of signals applied to the heating elements 174, as described above. When a signal is supplied to the heating element 174, therefore, calculation of at least two characters has been finished in the counter 166. However, a buffer for code signals may be arranged in the letters memory 172. Cvonversion and calculation of letter code signals may be carried out at same time in the letters memory 172, and when blanks corresponding to two characters is calculated, a specific code signal may be applied to the solenoid 142 and the motor system 170.

What is claimed is:

1. A thermal ink transfer printing apparatus for recordng on a recording medium a plurality of characters consisting of letters and blanks comprising:

a platen having a surface;

a carriage arranged adjacent to the platen;

a moving means for moving the carriage along a path parallel to said platen surface;

a thermal head including a plurality of heating elements arranged on a line crossing the direction of said path and selectively generating heat in response to electrical signals of the characters;

a support means for supporting the thermal head to the carriage in such a way that the thermal head can reciprocate in relation to the platen;

an ink film having a base layer and an ink layer on the base layer;

a running means for running the ink film between the thermal head and the platen surface with said base layer of said ink film directed to the thermal head;

a pressing means for pressing the thermal head against the platen surface to bring the ink film into close contact with the recording medium supplied between the ink film and the platen surface;

a detecting means for detecting that the number of characters to be applied to the thermal head is a predetermined serial number of blanks to thereby generate a stop signal; aand a releasing and stopping means for releasing, when the stop signal is applied, the thermal head from the pressing means and stopping the running of the ink film driven by the running means, upon lapse of a certain time from the time when a signal relating to the last letter just before the blanks to be followed is applied to the thermal head.

2. A thermal ink transfer printing apparatus according to claim 1, wherein the supporting means includes a fixture to which the thermal head is attached, and support members for swingably support the fixture in relation to the carriage.

3. A thermal ink transfer printing apparatus according to claim 2, wherein the support members include a pair of support pieces fixed on the carriage, and a rotating shaft supported by the support pieces, between which the fixture is fixed to the rotating shaft.

4. A thermal ink transfer printing apparatus accoridng to claim 3, wherein the pressing means has a solenoid fixed on the carriage, the solenoid having a core rod which advances to urge the fixture when current is applied to the solenoid, thereby thermal head being thus pressed against the platen surface by the core rod when the solenoid is powered.

5. A thermal ink transfer printing apparatus according to claim 4, wherein the pressing means has an elastic member for urging the fixture backward, and the thermal head is retreated by the elastic member when the solenoid is not powered.

6. A thermal ink transfer printing apparatus according to claim 1, wherein the running means includes ink ribbon winding and feeding shafts, ink ribbon winding and feeding reels fitted onto the ink ribbon winding and feeding shafts, respectively, and a driver means for driving the ink ribbon winding shaft, the ink ribbon being unwound from the ink ribbon feeding reel to be wound around the ink ribbon winding reel.

7. A thermal ink transfer printing apparatus according to claim 6, wherein the driver means has a motor and a transmitting means for transmitting the rotation of the motor to the ink ribbon winding shaft, and the transmitting means includes a friction plate fixed to the ink ribbon winding shaft, a friction member to which the rotation of the motor is transmitted, a sheet of felt interposed between the friction member and the friction plate, and an elastic member for urging the friction member against the friction plate, thereby motor rotation being transmitted by friction force caused between the sheet of felt and the friction member or plate, and sliding being caused between the sheet of felt and the friction member or plate when the diameter of ink ribbon wound around the ink ribbon winding reel beocmes large.

8. A thermal ink transfer printing apparatus according to claim 6, wherein the running means includes a stopper member fixed to the ink ribbon feeding shaft, a stay fixed to the carriage, a friction plate fixed to the ink ribbon feeding shaft to have friction contact with the stay, and an elastic member for urging the friction plate to the stay, thereby backward tension caused by friction between the stay and the friction plate being applied to the ink film fed from the ink ribbon feeding shaft.

9. A thermal ink transfer printing apparatus according to claim 1, wherein the moving means has a pair of parallel guide rails extending along the rotating shaft for the platen, the carriage being mounted on and moved along the guide rails, pulleys arranged near both ends of the guide rails, a motor, and a belt stretched between the pulleys in such a way that one end of the belt is fixed to the carriage and that the other end thereof is wound around the rotating shaft of the motor, thereby the carriage being reciprocated by forward and reversal rotations of the motor transmitted through the belt.

10. A thermal ink transfer printing apparatus according to claim 1, wherein the discriminating means applies a stop signal to the releasing and stopping means to release the thermal head from pressing operation and stop the running of the ink film when two blanks are serially applied to the thermal head.

11. A thermal ink transfer printing apparatus according to claim 10, wherein the predetermined time lapse starts from the time when the ink film is heated by the heating elements corresponding to the last letter just before the blanks to be followed, and ends to the time when that portion of the ink film which has been heated passes through its peeling-off point between the ink film and the recording medium.

12. A thermal ink transfer printing apparatus for recording on a recording medium a plurality of characters consisting of letters and blanks comprising:

a platen having a surface;

a carriage arranged adjacent to the platen;

a moving means for moving the carriage along a path parallel to said platen surface;

a thermal head including a plurality of heating elements arranged on a line crossing the direction of said path and selectively generating heat in response to electrical signals;

a supporting means for supporting the thermal head to the carriage in such a way that the thermal head can reciprocate in relation to the platen;

an ink film having a base layer and an ink layer on the base layer;

a running means for running the ink film between the thermal head and the platen roller with said base layer of said ink film directed to the thermal head;

a pressing means for pressing the thermal head against the platen surface to closely contact the ink film with the recording medium fed between the ink film and the platen surface;

a defining means for defining an angle $\theta$, the angle $\theta$ being formed by the ink film which extends from an ink film peeling-off point to the defining means, and by the recording sheet passing through the ink film peeling-off point, and the ink film peeling-off point representing a point where the ink film passing between the thermal head and the platen is peeled off from the recording sheet; and a releasing and stopping means for releasing the thermal head from the pressing means and stopping the running of the ink film driven by the running means when signals applied to the thermal head represent serial blanks more than a predetermined serial number of characters.

13. A thermal ink transfer printing apparatus according to claim 12, wherein the ink film peeling-off point is at that end of the thermal head which is located on the side of the defining means.

14. A thermal ink transfer printing apparatus according to claim 13, wherein the defining means has a guide shaft erected on the carriage.

15. A thermal ink transfer printing apparatus according to claim 14, wherein the defining means has another guide shaft, and the ink film passes between these two guide shafts to form a letter of S or reverse S.

16. A thermal ink transfer printing apparatus according to claim 12, wherein angle $\theta$ is set to be in a range 25°–50°.

17. A thermal ink transfer printing apparatus according to claim 16, wherein the platen roller has a rubber layer covered around the rotation shaft, and rubber hardness of this rubber layer is set to be in a range of 25°–40° (JIS standard).

18. A thermal ink transfer printing apparatus comprising:

a platen having a surface;

a carriage arranged adjacent to the platen;

a moving means for moving the carriage along a path parallel to the platen surface;

a thermal head including a plurality of heating elements arranged on a line crossing the direction of said path and selectively generating heat in response to electrical signals;

a supporting means for supporting the thermal head to the carriage in such a way that the thermal head can reciprocate in relation to the platen;

an ink film having a base layer and an ink layer on the base layer;

a running means for running the ink film between the thermal head and the platen roller with said base layer of said ink film directed to the thermal head;

a pressing means for pressing the thermal head against the platen surface to bring the ink film into close contact with a recording medium supplied between the ink film and the platen surface;

a detecting means for detecting that no electrical signal is to be applied to the thermal head over a predetermined continuous time length, to thereby generate a stop signal; and a releasing and stopping means for releasing, when the stop signal is applied, the thermal head from the pressing means and stopping the running of the ink film driven by the running means, upon lapse of a certain time from the time when a last electrical signal is supplied to the thermal head.

* * * * *